June 14, 1966  R. ECKELS  3,255,679
METHOD OF MAKING SNAP-OUT MANIFOLD
Filed Nov. 30, 1964  4 Sheets-Sheet 1

INVENTOR.
ROY ECKELS
BY
Leonard H. King
ATTORNEY

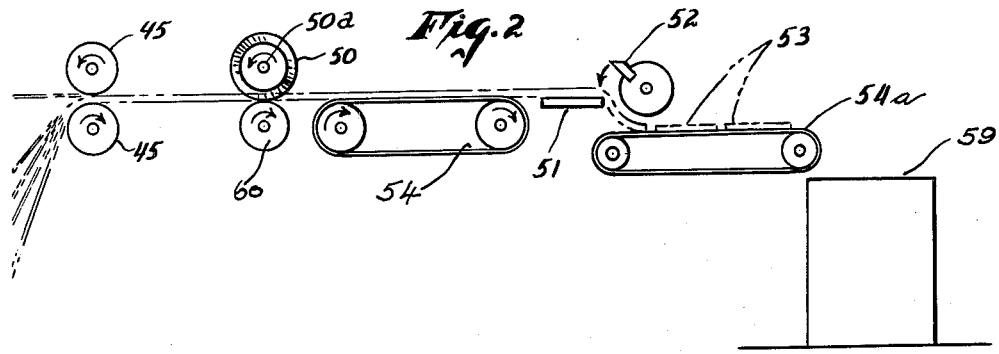
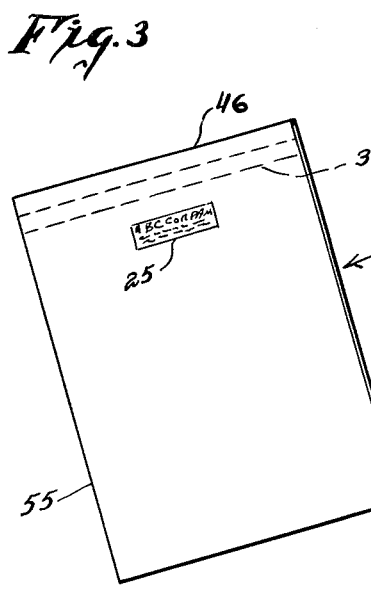
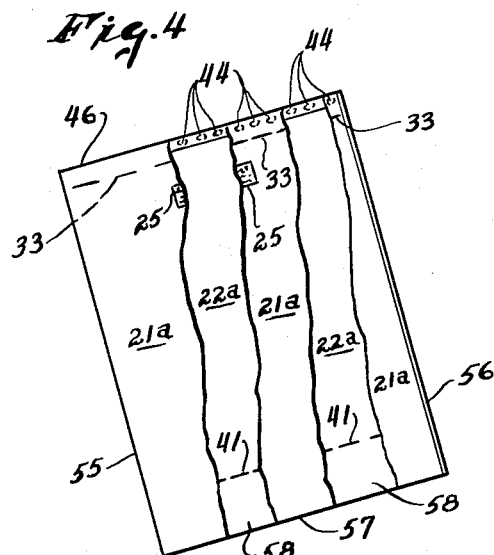
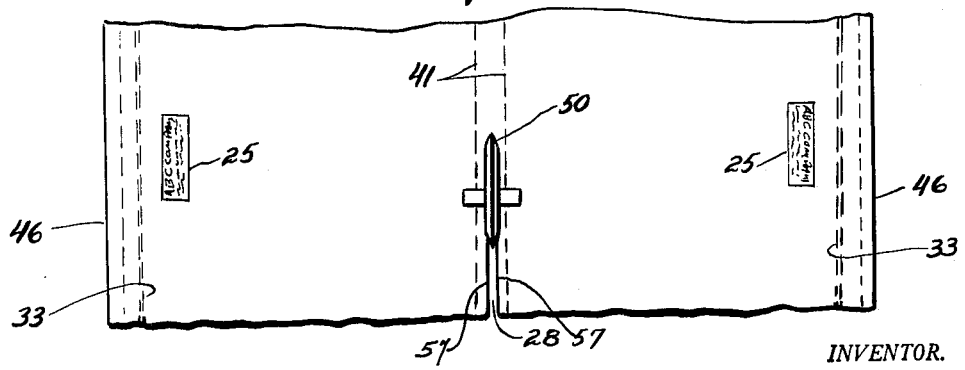
INVENTOR.
ROY ECKELS

June 14, 1966   R. ECKELS   3,255,679
METHOD OF MAKING SNAP-OUT MANIFOLD
Filed Nov. 30, 1964   4 Sheets-Sheet 3
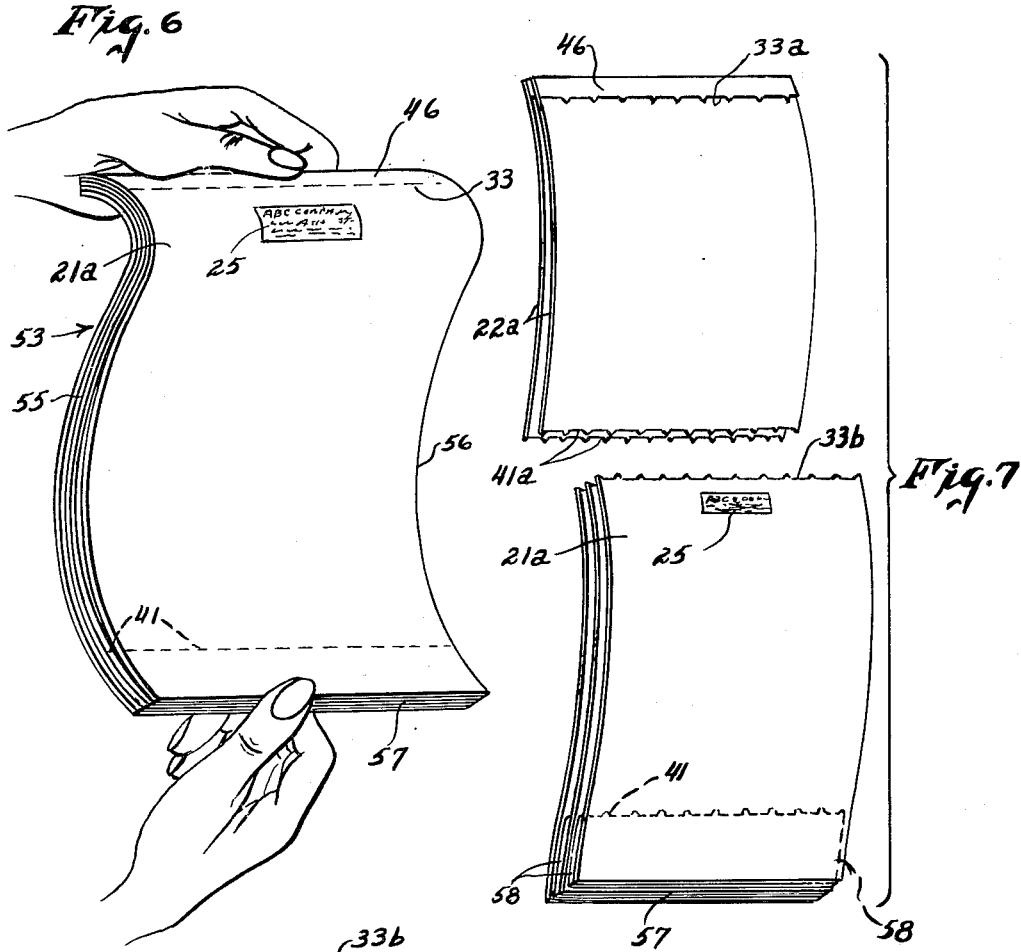
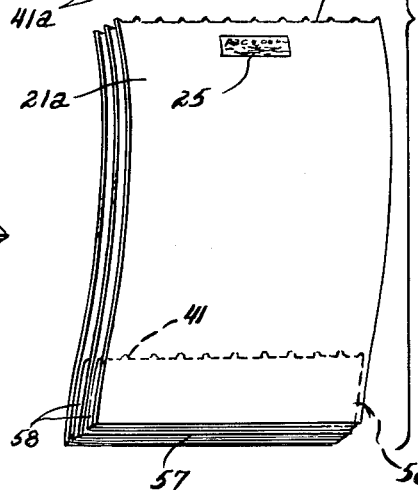
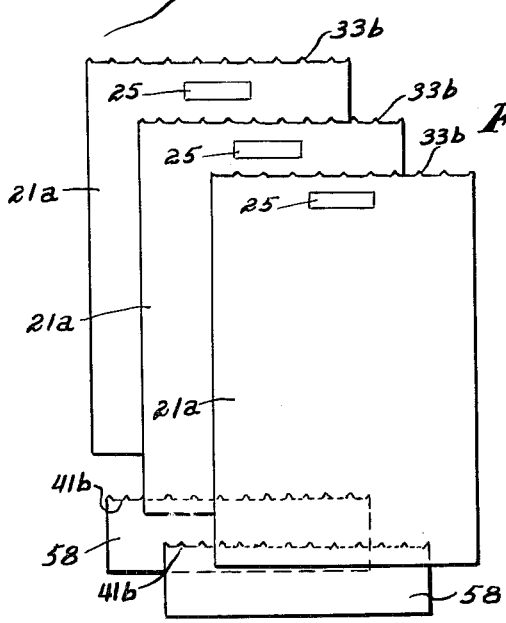
INVENTOR.
ROY ECKELS
BY
Leonard H. King
ATTORNEY June 14, 1966 — R. ECKELS — 3,255,679
METHOD OF MAKING SNAP-OUT MANIFOLD
Filed Nov. 30, 1964 — 4 Sheets-Sheet 4
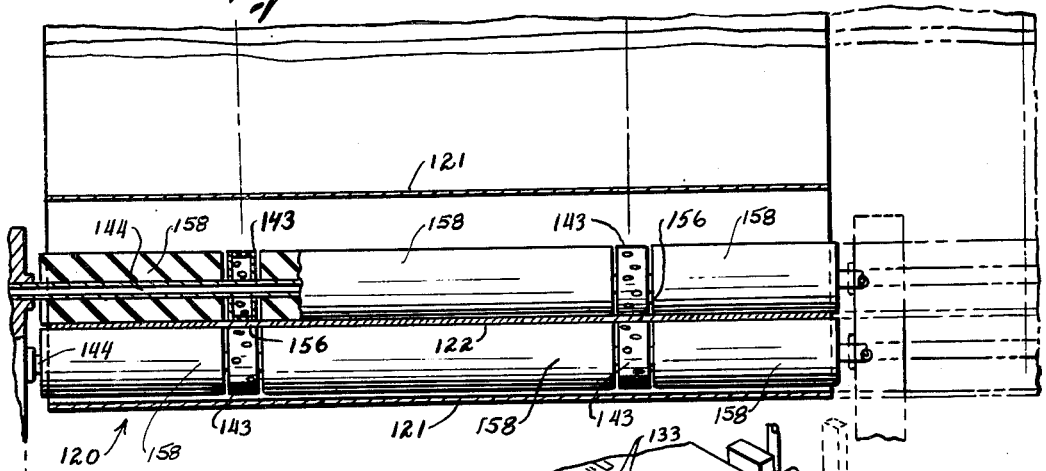
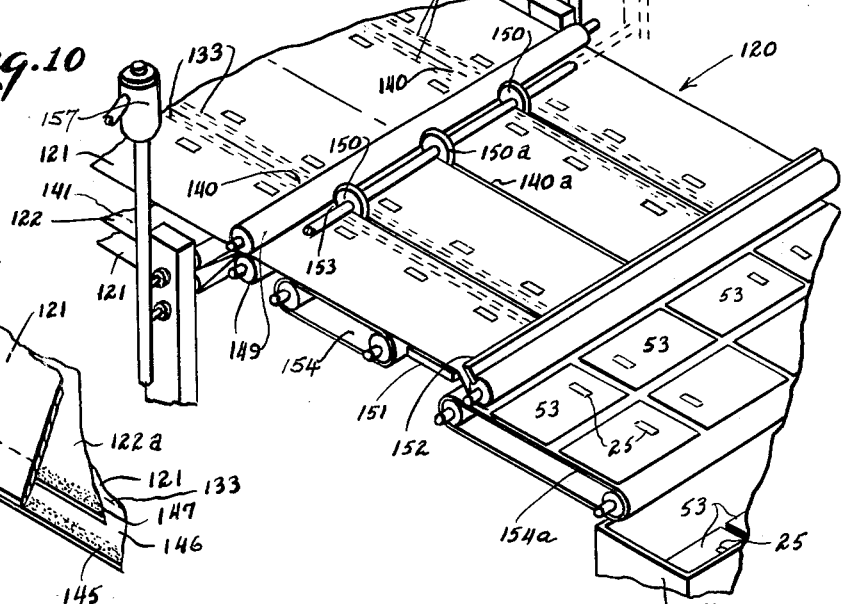
INVENTOR.
ROY ECKELS
BY Leonard H. King
ATTORNEY

United States Patent Office 3,255,679
Patented June 14, 1966

3,255,679
METHOD OF MAKING SNAP-OUT MANIFOLD
Roy Eckels, 610 Seaman Ave., Baldwin, N.Y.
Filed Nov. 30, 1964, Ser. No. 414,609
4 Claims. (Cl. 93—1)

This application is a continuation-in-part of my copending application for Snap-out Manifold and Method of Making Same, filed November 30, 1962, Serial No. 241,345, now abandoned.

The present invention relates to snap-out manifold sets and is particularly directed to a bond weight, multiple sheet manifold set having interleaved carbon paper as well as the method that permits its manufacture from a relatively wide web.

Manifold sets of the prior art have been to the best of applicant's knowledge, assembled or collated in a single width on a single machine. As a matter of fact, until very recently, equipment to collate webs up to 38 inches in width was not available so that to produce manifold sets, it was necessary to use a paper web substantially the same width as the finished product. In the practice of the prior art it was common to print on a wide web of paper which was longitudinally slit one or more times. Each length was subsequently rewound on a separate roll. Each roll would then be individually interleaved with carbon paper and bound at the same time on separate machines. Only at this time could the interleaved web be cut transversely to provide manifold sets of the desired length. However, since the prior art methods and apparatus entailed cutting a printed web longitudinally to produce several narrower, printed webs, it then became a difficult problem to maintain registry of the sheets from top to bottom when they were interleaved and bound.

The prior art manifold sets were run longitudinally on the cutting and binding machine and only one width manifold could be run regardless of the machine capacity. Consequently, the perforations along which the set was ultimately to be torn had to be made transversely to the web movement. This was perfectly acceptable for heavy card stock, say of 60-pound weight and up. Such material is used for sales books wherein a minimum number of perforations, that is, long slits having a minimum of land therebetween, are utilized so that the stock will tear. However, transverse perforation was not practical on relatively thin bond paper between 9 and 20-pound weight which must have a large number of perforations and consequently a large number of lands therebetween in order to maintain its strength. Tension is always maintained on the paper web during its longitudinal travel and, in order for it not to break during collating, the stock must be heavy and/or have a minimum number of perforations.

The method of the present invention utilizes a full width web that has been printed and suitably perforated in accordance with the number of manifold sets to be accommodated by the width dimension of the web. The full width web is interleaved and then bound as by gluing. Only after this step is the web slit longitudinally to produce a plurality of webbed manifold sets. It should be noted that the spacing of the longitudinal slitters may be varied to provide different length manifolds and the transverse cutting may be varied to provide different width manifolds. By longitudinally slitting the web after it is interleaved and bound, registry of the sheets from top to bottom is more easily maintained.

The printing industry, and in particular that segment of the industry that produces these manifold sets, is highly competitive. Because of industry wide union contracts, labor costs are substantially the same for each manufacturer. There are relatively few fabricators of machines so that the cost of equipment is substantially the same for each plant. Since the cost of raw material is for all practical purposes the same for all the printers of a given size, the only thing that can be offered to a customer is improved service. Therefore, if one printer could materially reduce his production cost, he would then have a marked competitive advantage. The present invention provides this in addition to an improved manifold set because a plurality of individual mnaifolds may be simultaneously bound thus reducing the handling costs. Moreover, in contrast to the prior art wherein a single collating machine could handle the binding of only a single manifold set, the present invention permits the simultaneous collating of a plurality of manifolds. In addition, several different size manifold sets can be collated and bound on a single machine. The practical effect of this feature is that the printer no longer needs to accumulate or match his orders to a particular machine. A number of different manifold sets can be accommodated by a single machine. Thus, if four manifold sets are interleaved, bound and slit at one time, the handling cost and the production time is approximately one-fourth that of individual assembly.

Accordingly, an object of the present invention is to provide an improved method for collating and binding the sheets of a manifold set.

It is another object to provide a method for the manufacture of manifold sets that permits the use of wide printed webs.

An additional object is to provide a method that includes gluing and longitudinally slitting the manifold set after the web is longitudinally perforated.

A further object is to provide a method that utilizes a large number of perforations per manifold width.

Another object is to provide a method of the aforementioned type that is applicable to 9–20 pound weight manifold sets.

Still another object is to provide an improved manifold set comprised of 9–20 pound weight paper.

These and other features, objects and advantages of the invention will, in part, be pointed out with particularity and will, in part, become obvious from the following more detailed description of the invention, taken in conjunction with the accompanying drawing which forms an integral part thereof.

In the various figures of the drawing like reference characters designate like parts.

In the drawing:

FIG. 2 is a side elevation of a fragment of said collating machine.

FIG. 3 is a plan view of an interleaved form or manifold set embodying my invention.

FIG. 4 is a plan view of the manifold set of FIG. 3 with certain of the leaves thereof partially broken away.

FIG. 5 is a plan view of a fragment of two manifold sets joined together in tandem and in process of separation into two sets of manifolds.

FIG. 6 is a perspective view of a manifold set manipulated in readiness to separate the forms from the stub.

FIG. 7 is an exploded view of the manifold immediately after the forms have been separated from the stub.

FIG. 8 is an exploded view of the forms, and of the discarded carbon paper ribbons.

FIG. 9 is a vertical cross-sectional view of a fragment of a modified form of collating machine for carrying out my method of manufacture.

FIG. 10 is a perspective view of a fragment of said modified form of collating machine.

FIG. 11 is a perspective view of a fragment of another modified form of collating machine.

FIGS. 12 and 13 are perspective views of fragments of two other modified manifold structures; and FIG. 14 is a cross sectional view of a detail taken along line 14—14 of FIG. 13, looking in the direction of the arrows.

Figure 1:
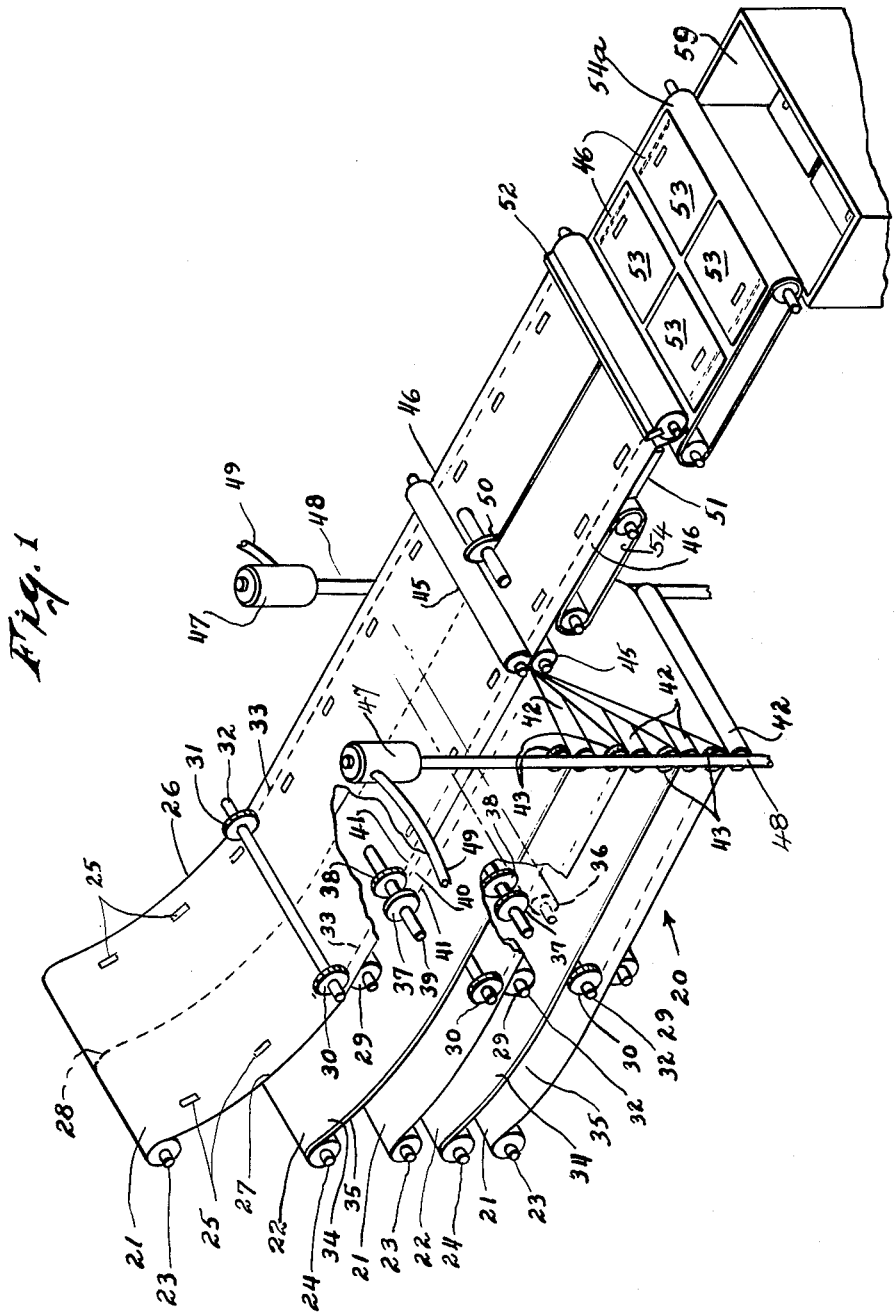
FIG. 1 is a perspective view of one suggested form of collating machine with certain of the parts omitted, and with certain other parts partially broken away.

The collating machine 20 (FIG. 1) is designed to manufacture my manifold sets (FIG. 3) in tandem, or two abreast (FIG. 5). Said collating machine includes a suitable frame (not shown) for supporting a plurality of webs or rolls of paper stock 21, 21 alternating with webs or rolls of carbon paper stock 22, 22 arranged one below the other, as in tier.

The paper stock 21, 21 which is in the 9–20 pound weight range and the carbon paper 22, 22 is unwound from the spindles 23, 23 and 24, 24, respectively, in any suitable manner as by means of power driven draw rolls (not shown).

If the paper stock is to carry printed matter, one or more sheets of the paper stock may be fed through a suitable printing press, such as a cylinder press (not shown) to print the forms 25 in tandem, or two abreast, and in continuous strips upon said paper stock 21, 21 with the printing spaced away from the free, running side edges 26, 27 towards the ultimate line of separation 28 between the printed forms 25, 25. After printing the ink is allowed to dry.

Each printed sheet is next fed between a roller 29 and a pair of perforating wheels 30, 31 which are adjustable along their shaft 32 at the desired distance from each of the running side edges 26, 27 of each strip of forms 25, 25. The wheels 30, 31 are keyed to the shaft 32 to perforate each printed sheet with lines of perforations 33, 33 running in parallel spaced relation to the running side edges 26, 27 of said printed sheet. If the carbon paper 22, 22 is the same width as the paper stock 21, 21, the edge bands 34, 34 which parallel the side edges 35, 35 of the carbon paper 22, 22 may be free of carbon to constitute selvages or feather edges. The selvages or feather edges of the carbon paper may be effectively bonded with the mating edges of the printed sheets to form the stub of the manifold set, as hereinafter described. Each sheet of carbon paper stock 22, is also fed between a roller 36 and a pair of perforating wheels 37, 38 which are keyed to and adjustable along their shaft 39. Each pair of perforating wheels 37, 38 straddle the cutting line 40 of the sheets of carbon paper stock 22, 22, and perforate each of said sheets of carbon paper with two spaced lines of perforations 41, 41 (FIG. 5) positioned on opposite sides of their respective cutting lines 40, 40 and equidistant therefrom. When the tandem printed forms are identical the cutting line 40 will constitute the center line of the carbon paper 22, 22. If the forms to be printed differ in size crosswise the machine, the cutting line 40 will be shafted laterally relative to the side edges 26, 27 of the printed sheets, and the perforating wheels 37, 38 will be readjusted along their shafts 39, 39 to straddle the new cutting line 40.

After the forms 25, 25 and the carbon paper stock 22, 22 have been perforated, they are fed between the rollers 42 and the hollow gluing rings 43, 43 associated therewith. The gluing rings 43, 43 apply a line of spots of glue 44 (FIG. 4) along both marginal edges of at least one of the opposed faces of each of the interleaved sheets of paper stock 21 and/or of the edge bands 34, 34 of the carbon paper, and all of said interleaved sheets then pass between the squeeze rollers 45, 45 to bond the glue-coated marginal edges of the interleaved sheets together to form two stubs 46, 46 which now constitute the bonded running edges of the interleaved sheets and produce a structure consisting of two strips of manifold sets joined together in tandem substantially as shown in FIG. 5. Glue is supplied to the gluing rings 43, 43 from one or more pressurized containers 47 over a common supply pipe 48 and a hollow shaft whereon the gluing rings are mounted (see FIG. 9). Pressure is applied to the containers 47 over a compressed air line 49 from any suitable source of compressed air (not shown). The gluing rings 43, 43 may be replaced by nozzles for spraying the glue upon the stock.

After the glue has set and formed the stubs, the cutter 50 splits the tandem manifolds along the cutting line 40 (or 28) which is located substantially midway between the lines of perforations 41, 41 (compare FIGS. 1 and 5) previously formed in the sheets of carbon paper stock 22, 22 thus separating the tandem manifold sets into two strips of manifold sets, each such strip having a stub 46 which binds the printed forms and their interleaved carbons together along one of the running edges of said strip. Each strip is then advanced by the conveyor 54 over an anvil 51 and is cut crosswise between adjoined manifold sets by a cut-off knife 52 which thus separate each manifold set 53 in succession from its strip to form a finished manifold 53 (FIG. 3) containing a plurality of carbon-interleaved forms. The finished manifolds 53 are deposited upon the delivery conveyor 54a which stacks them in a suitable box or receptacle 59 (FIG. 1).

The leaves 21a (FIG. 6) of the finished manifolds 53 are detachably attached to the stub 46 by their aligned rows of perforations 33 (see FIG. 4), but the interleaved sheets of carbon paper 22a (FIG. 7) are permanently bonded in the stub 46 and are provided with aligned rows of perforations 41, 41 (FIG. 4) extending across the interleaved carbons from side edge 55 to side edge 56 of the manifold 53 and in parallel spaced relation to the bottom edge 57 thereof. The sheets of carbon paper 22a are coextensive with the leaves 21a of the manifold 53, and the upper marginal edge of each leaf 21a and of each interleaved carbon 22a is bonded in the stub 46.

The manner of use is as follows: Appropriate data may be recorded upon the manifold 53 (FIG. 3), and since the interleaved sheets of carbon paper 22a are coextensive with the printed forms entries may be recorded to the physical end of the uppermost form in the manifold and these entries will be duplicated by the carbon process upon all of the duplicate copies thereof in the manifold. After the data has been completely recorded, the forms may be separated from the manifold 53 and from each other. To do this the stub 46 of the manifold 53 is grasped with one hand, the bottom 57 is grasped with the other hand, and the manifold is flexed slightly (FIG. 6); the stub 46 and the bottom 57 of the manifold 53 are then snapped apart, whereupon the printed forms 21a (FIG. 7) are detached from the stub 46 along the perforated edges 33a, 33b; the narrow carbon ribbons 58 (FIG. 7) are simultaneously detached at 41a and 41b (see FIGS. 7 and 8), leaving the major portion 22a of each carbon sheet still bound in the stub 46 (FIG. 7). The stub 46, together with the carbon sheets 22a (FIG. 7) is discarded, and by holding the printed forms loosely near their perforated edges 33b (FIG. 7) the narrow carbon ribbons 58 will either fall out or may be shaken out and discarded (FIG. 8), leaving the several copies 21a of the printed form (FIG. 8) ready for distribution as business routine requires.

The hereinbefore described method of manufacture doubles the manifold producing capacity of a collating machine. It should be understood that even larger numbers of manifold may be simultaneously produced by the same method. In carrying out the method as described the manifold sets are collated in "foot to foot" abutment (FIG. 1), but by adjusting the perforating wheels, the gluing rings, and the cutter, along their respective shafts, the sheets to be manifolded could be collated with the stubs of the dual manifold sets in "head to head" abutments (FIG. 10), or with the stub of one of the dual manifold sets abutting the foot of the other (FIG. 11) in "head to foot" abutment. The make-up of the printed forms would necessarily be modified to develop a lay-out appropriate to the particular method of collating employed.

The perforating wheels 30, 31 and 37, 38 (FIG. 1) are adjustable along their respective shafts 32 and 39, and the cutter 50 is also adjustable along its shaft 50a (FIG. 2), to produce two separate strips of manifold sets of dissimilar lengths, and the knife 52 may be suitably synchronized to cut between manifolds of any desired width, so that complete flexibility in the length and the width of the finished manifold sets 53, within the overall capacity of the collating machine, may be obtained (compare FIGS. 1, 10 and 11).

By moving one gluing ring of each tier away from the running edge 26 and/or 27 of each sheet of paper stock 21, towards the center line of the collating machine, the location of the bonded stubs may be changed at will, and by adjusting the perforating wheels 30 and/or 31, and 37 and/or 38, and the cutter 50, along their respective shafts, the positions of the lines of perforations, and/or the line of division between strips of manifold sets, may be changed to conform to the position of the relocated stubs. In this manner the strips of manifold sets may be collated with the stub of one strip of manifold sets in abutment with the stub of another such strip (FIG. 10), or the strips of manifold sets may be collated with the stub of one such strip in abutment with the foot or ultimate free edge of another such strip (FIG. 11).

The collating machine may be of any desired width within the limits of the overall width of commercially practical webs of print paper and of carbon paper. The collating machine is adjustable to effect the continuous production of two (FIGS. 1 and 11), or more (FIGS. 9 and 10), strips of manifold sets, of the same size, or of different sizes, simultaneously.

After the paper stock has been printed, and the resulting forms and the carbon paper stock have been perforated, interleaved, bonded, split, and fully separated, as hereinbefore described, each of the resulting manifold sets will conform to the structure shown generally in FIG. 3, but which may be better understood by referring to FIG. 4 wherein some of the interleaved sheets are partially removed to better illustrate the construction of the manifold set.

FIGS. 9 and 10 show in bold lines fragment of so much of a modified form of collating machine 120 as is necessary to illustrate the simultaneous and continuous production of as many as four strips of manifold sets. The addenda in broken lines show in phantom how the collating machine may be extended crosswise to effect the simultaneous production of additional strips of manifold sets. It should be understood therefore that the machine 120 may be of any width desired within practical limits of operating efficiency.

If the machine 120 is to print and collate, the forms will be printed in multiple in a printing press or printing unit (not shown), each form being sized to conform with the dimensions of its ultimate and corresponding manifold set.

The perforating wheels (not shown) for appropriately perforating each sheet of paper stock 121 and each sheet of carbon paper stock 122 (FIGS. 10 and 11), will be adjusted laterally along their respective shafts to the appropriate positions to perforate the print paper 121 along the lines of perforations 133 and the carbon paper along the lines of perforations 141.

The collating machine shown in FIG. 10 is set up to have a production capacity of four strips of manifold sets, or four manifold sets, abreast, with their bonded stubs positioned in "head to head" abutment, and with the two inner strips of manifolds in "foot to foot" abutment.

It should be understood, however, that the collating machine 120 could be set up to produce four manifold sets abreast, with the stubs of the two outer strips of manifolds formed along the outer, side, or running edges of the collating machine, as shown in FIG. 1, and with the opposite edges of said outer strips joined "foot to foot" to the two inner strips of manifolds joined together "head to head." This set-up would in effect be the reverse of the set-up shown in FIG. 10.

When the strips of manifold sets are manufactured with their bonded stubs in "head to head" abutment (FIGS. 9 and 10), the gluing rings 143, 143, are adjusted to inboard along their hollow shafts 144, 144, relative to the rollers 158, 158 (FIG. 9), and the liquid glue is fed to the gluing rings under suitable pressure from the pressurized tank 157 through the hollow shafts 144, 144 to deposit either two spaced rows of glue spots, or two spaced strips of glue, along each of the two double width carbon-free lanes 156, 156 which run lengthwise along each side of each sheet of the interleaved carbon paper stock 122 (FIG. 9). When the sheets of paper stock 121, 121, pass between the squeeze rolls 149, 149 (FIG. 10) with the carbon paper stock 122, carrying two dual rows of glue spots, or two dual strips of glue, interleaved between the sheets of paper stock 121, 121, the paper stock and the carbon paper are bonded together to form two pairs of dual stubs, and the collated and bonded stock is thereafter split simultaneously into four strips of manifold sets by splitting the stock between each pair of dual stubs along the cutting lines 140, 140 by means of the cutters 150, 150 and by splitting the "foot to foot" ends of the two inner strips of manifold sets along the cutting line 140a by means of the cutter 150a. The four strips of manifold sets are then fed by the conveyor 154 over the anvil 151 (FIG. 10) where they are separated into the individual manifold sets 53 by the cut-off knife 152 and fed forward by the delivery conveyor 154a to the delivery end of the collating machine where they may be stacked in the stacking box 159.

When glue is applied to both sides of the carbon paper stock (FIGS. 9 and 10), clearance should be mainained between the lower roller of rollers 158, 158 including the lower ring of gluing rings 143, 143, and the sheet of paper stock 121 positioned beneath said lower gluing rings. This clearance may be effected in any preferred manner as by introducing a spacing rod or roller (not shown) below said lower gluing rings and above said sheet of paper stock 121, so that said sheet of paper stock feeds around the said rod or roller before passing between the squeeze rolls 149, 149 (FIG. 10).

The gluing rings 43 (FIG. 1) or 143 (FIG. 9) may be replaced by nozzles for applying the spots or strips of glue to the surfaces of the appropriate margins of the paper stock and/or of the carbon paper stock to bond them together in stub form in the various ways herein described. An "instant drying" type of glue is preferred.

The correlation between the conveyors, the anvil, and the cut-off knife, of the collating machines, is perhaps best illustrated in FIG. 2. The conveyor 54 feeds the strips of manifold sets, which were split apart by the rotary cutter 50 and its associated roller 60, towards the anvil 51, and the forward end of each strip advances over the anvil until it comes to rest upon the delivery conveyor 54a, which pulls each strip forward, while simultaneously the cut-off knife 52 rotates counterclockwise towards the anvil 51. The clearance between the anvil 51 and the cut-off knife 52 is such that the advancing strip is severed by the cut-off knife blade 52. The conveyors 54 and 54a and the cut-off knife 52 are so synchronized that all manifold sets 53 produced from the same strip of manifold sets are uniform in all respects.

The machine may be modified to bond the paper stock with carbon paper which is carbonized to its running edges so that it lacks a selvage or feather edge.

FIG. 12 shows how a fully carbonized carbon paper 122a, which is somewhat narrower than the paper stock 121, 121 may be bonded in the stub of the manifold set by applying strip glue at 145 between the mating margins 146, 146 of the adjacent sheets of paper stock 121, 121 and at 147 between the margin of the carbon paper 122a and the margin 146 of the upper or overlying sheet of paper stock 121. This is sometimes described as dual strip gluing. The dual strips of glue may be applied to the margin of the underface of the upper sheet of paper stock 121, if preferred.

When the paper stocks 121, 121 and the fully carbonized carbon paper stock 122b (FIG. 13) are of the same width, the carbon paper may be gang hole punched along its marginal edge at 148, 148, so that strip glue applied to the mating margin of either sheet of paper stock, preferably the mating margin of the upper or overlying sheet 121, will be forced through the punched holes 148, 148 under pressure exerted by the squeeze rolls 149, 149 to spot glue the mating margins of the paper stock 121, 121 at 145a, 145a (FIGS. 13 and 14) and to strip glue the carbon paper 122b to the upper sheet of paper stock 121, to provide a bonded stub for the manifold sets.

The gluing rings, or the nozzles, as the case may be, are designed to apply one or more strips, or lanes of glue to the appropriate mating margin, or margins, of the appropriate stock, or stocks to provide a bonded stub for the manifold sets.

There has been disclosed heretofore the best embodiment of the invention presently contemplated and it is to be understood that various changes and modifications may be made by those skilled in the art without departing from the spirit of the invention.

What is claimed is:

1. The method of simultaneously producing a plurality of manifold sets comprising the steps of:

feeding a plurality of continous webs of printed paper stock in the 9–20 pound weight range and at least one continuous web of carbon paper stock into a collating apparatus such that the carbon paper stock is interposed between the webs of paper stock;

longitudinally perforating each of the webs of paper stock and carbon paper stock with at least two continuous lines of perforations;

applying an adhesive material to predetermined portions of at least one of the webs of paper stock and carbon paper stock;

pressing the webs of paper stock and carbon paper stock between a pair of rollers to thereby allow the adhesive material to bond together the webs of paper stock and carbon paper stock at one of their ends;

longitudinally cutting the entire length of the joined webs after they have been perforated and bonded to thereby provide at least two continuous sections of joined webs; and transversely cutting each of the sections of joined webs at regularly spaced intervals to simultaneously provide at least two manifold sets.

2. The method of simultaneously producing a plurality of manifold sets comprising the steps of:

longitudinally perforating each of a plurality of continuous webs of printed paper stock in the 9–20 pound weight range with at least two continuous lines of perforations parallel with but spaced apart from each other;

longitudinally perforating at least one continuous web of carbon paper stock with at least two continuous lines of perforations parallel with but spaced apart from each other;

feeding the carbon paper stock between the webs of paper stock, the paper stock and carbon paper stock being coextensive with each other;

binding the webs of paper stock and the carbon paper stock together in at least two continuous lines along the length of the stock;

longitudinally cutting the entire length of the paper and carbon stock after perforating and binding to provide at least two continuous sections of bound and perforated stock; and transversely cutting each of the sections at regularly spaced intervals to simultaneously provide at least two manifold sets.

3. The method of simultaneously producing a plurality of manifold sets comprising the steps of:

feeding a plurality of continuous webs of printed paper stock in the 9–20 pound weight range and at least one continuous web of carbon paper stock to perforating apparatus;

longitudinally perforating each web of paper stock with at least two continuous lines of perforations parallel with but spaced apart from each other;

longitudinally perforating each web of carbon paper stock with at least two continuous lines of perforations parallel with but spaced apart from each other;

passing the perforated paper stock and carbon paper stock webs, one stacked upon the other, each coextensive with the other, with a paper stock web topmost in the stack and alternate webs of carbon paper stock and paper stock sheets directly under the topmost paper stock web, to a binder;

aligning the perforated lines of the paper webs, one directly above the other, and aligning the perforated lines of the carbon paper stock, one directly above the other, the perforated lines of the paper webs being parallel with but spaced apart from the perforated lines of the carbon paper stock;

binding the webs of carbon stock and paper stock together along a line proximate to and parallel with each of the perforated lines on the paper webs;

longitudinally cutting the entire length of paper and carbon stock after perforating and binding to thereby provide at least two sections of bound and perforated webs; and transversely cutting each of the sections at regularly spaced intervals to simultaneously provide at least two manifold sets.

4. The method of simultaneously producing a plurality of manifold sets comprising the steps of:

feeding a plurality of continuous webs of printed paper stock in the 9–20 pound weight range and at least one continuous web of carbon paper stock to perforating apparatus;

longitudinally perforating each web of paper stock with at least two continuous lines of perforations parallel with but spaced apart from each other;

longitudinally perforating each web of carbon paper stock with at least two continuous lines of perforations parallel with but spaced apart from each other;

passing the perforated paper stock and carbon paper stock webs, one stacked upon the other, each coextensive with the other, with a paper stock web topmost in the stack and alternate sheets of carbon paper stock and paper stock webs directly under the topmost paper stock web, to a binder;

aligning the perforated lines of the paper webs, one directly above the other, and aligning the perforated lines of the carbon paper stock, one directly above the other, the perforated lines of the paper webs being parallel with but spaced apart from the perforated lines of the carbon paper stock;

punching a continuous line of holes in the sheets of carbon stock and paper stock proximate to and parallel with each of the perforated lines on the paper webs and forcing adhesive material into the punched holes thereby binding the webs of paper stock and carbon paper stock together along the lines of punched holes;

longitudinally cutting the entire length of the paper and carbon stock after perforating and binding to thereby provide at least two continuous sections of bound and perforated webs; and transversely cutting each of the sections at regularly spaced intervals to provide simultaneously at least two manifold sets.

References Cited by the Examiner

UNITED STATES PATENTS

| | | | |
|---|---|---|---|
| 2,255,777 | 9/1941 | Jones | 282—22 X |
| 2,518,010 | 8/1950 | Holmwood et al. | 93—1 |
| 2,539,755 | 1/1951 | Rogers | 93—1 |
| 3,022,094 | 2/1962 | Kehoe | 282—22 |
| 3,081,111 | 3/1963 | Kehoe | 282—22 |

FOREIGN PATENTS 102,663  12/1937  Australia.
477,783  1/1938  Great Britain.

FRANK E. BAILEY, *Primary Examiner.*

LAWRENCE CHARLES, *Examiner.*

B. STICKNEY, *Assistant Examiner.*